US011454970B2

(12) United States Patent
Sujan et al.

(10) Patent No.: US 11,454,970 B2
(45) Date of Patent: Sep. 27, 2022

(54) ADJUSTMENT OF AUTONOMOUS VEHICLE CONTROL AUTHORITY

(71) Applicant: Cummins Inc., Columbus, IN (US)

(72) Inventors: Vivek Anand Sujan, Columbus, IN (US); Robert L. Kern, Indianapolis, IN (US); Jennifer Kay Light-Holets, Greenwood, IN (US)

(73) Assignee: Cummins Inc., Columbus, IN (US)

( * ) Notice: Subject to any disclaimer, the term of this patent is extended or adjusted under 35 U.S.C. 154(b) by 269 days.

(21) Appl. No.: 16/416,604

(22) Filed: May 20, 2019

(65) Prior Publication Data

US 2019/0354101 A1 Nov. 21, 2019

Related U.S. Application Data

(60) Provisional application No. 62/674,291, filed on May 21, 2018.

(51) Int. Cl.
*G05D 1/00* (2006.01)
*G05D 1/02* (2020.01)

(52) U.S. Cl.
CPC ......... *G05D 1/0088* (2013.01); *G05D 1/0011* (2013.01); *G05D 1/0291* (2013.01); *G05D 2201/0213* (2013.01)

(58) Field of Classification Search
CPC ............... G05D 1/0088; G05D 1/0011; B60K 2310/30; B60W 50/12
See application file for complete search history.

(56) References Cited

U.S. PATENT DOCUMENTS

| | | | |
|---|---|---|---|
| 6,188,957 B1 | 2/2001 | Bechtolsheim et al. | |
| 6,502,035 B2 | 12/2002 | Levine | |
| 7,394,400 B2 | 7/2008 | Tauchi | |
| 8,548,664 B2 | 10/2013 | Uchida et al. | |
| 8,589,014 B2 | 11/2013 | Fairfield et al. | |
| 8,634,980 B1 | 1/2014 | Urmson et al. | |
| 9,075,413 B2 | 7/2015 | Cullinane | |
| 9,221,396 B1 | 12/2015 | Zhu et al. | |
| 9,235,990 B2 | 1/2016 | Aimura | |
| 9,274,525 B1 | 3/2016 | Ferguson et al. | |
| 9,507,346 B1 | 11/2016 | Levinson et al. | |
| 9,566,986 B1* | 2/2017 | Gordon | G05D 1/0061 |
| 9,594,379 B1 | 3/2017 | Ferguson et al. | |
| 9,645,579 B2* | 5/2017 | Switkes | G05D 1/0293 |
| 10,078,338 B2* | 9/2018 | Smartt | G08G 1/161 |
| 10,249,109 B1* | 4/2019 | Konrardy | H04L 12/2816 |
| 10,254,764 B2* | 4/2019 | Laubinger | B60W 50/14 |
| 10,347,125 B2* | 7/2019 | Camacho | G05D 1/0088 |
| 10,935,974 B1* | 3/2021 | Fields | B60W 50/14 |

(Continued)

FOREIGN PATENT DOCUMENTS

| | | |
|---|---|---|
| WO | 2013022154 | 2/2013 |
| WO | 2015099696 | 7/2015 |
| WO | 2017079321 | 5/2017 |

*Primary Examiner* — Peter D Nolan
*Assistant Examiner* — Tanya C Sienko
(74) *Attorney, Agent, or Firm* — Taft Stettinius & Hollister LLP (57) ABSTRACT

Apparatuses, methods, and systems adjust the level of control authority of one or more autonomous vehicles in order to respond to changes in one or more operating conditions associated with the vehicle, operator, environment, route, and other conditions.

22 Claims, 5 Drawing Sheets

(56) References Cited

U.S. PATENT DOCUMENTS

| | | | |
|---|---|---|---|
| 2004/0138809 | A1 | 7/2004 | Mukaiyama |
| 2006/0271275 | A1* | 11/2006 | Verma .............. G08G 1/096791 |
| | | | 701/532 |
| 2011/0301813 | A1 | 12/2011 | Sun et al. |
| 2012/0083959 | A1* | 4/2012 | Dolgov .................... B60R 1/00 |
| | | | 701/23 |
| 2015/0241878 | A1* | 8/2015 | Crombez .............. B60W 50/08 |
| | | | 701/23 |
| 2016/0304124 | A1* | 10/2016 | Fujiyoshi ............. B62D 15/025 |
| 2017/0212515 | A1* | 7/2017 | Bertollini ............... G05D 1/021 |
| 2017/0227959 | A1* | 8/2017 | Lauffer ............ B60W 50/0098 |
| 2017/0247040 | A1* | 8/2017 | Miller ................... B60W 10/20 |
| 2018/0057015 | A1* | 3/2018 | Barke .................. B60W 50/14 |
| 2018/0101170 | A1* | 4/2018 | Cawley ................ G05D 1/0061 |
| 2018/0237030 | A1* | 8/2018 | Jones .................. B60W 50/082 |
| 2018/0239352 | A1* | 8/2018 | Wang .................. B60W 60/0053 |
| 2018/0292833 | A1* | 10/2018 | You ...................... G05D 1/0088 |
| 2018/0342113 | A1* | 11/2018 | Kislovskiy ............. G07C 5/008 |
| 2019/0025825 | A1* | 1/2019 | Takahama ............ B60W 50/14 |
| 2019/0049954 | A1* | 2/2019 | Mitchell ........... B60W 60/0059 |
| 2019/0232973 | A1* | 8/2019 | Volkow .................. G07C 5/008 |
| 2020/0317216 | A1* | 10/2020 | Konrardy ............ B60W 30/182 |

* cited by examiner

ADJUSTMENT OF AUTONOMOUS VEHICLE CONTROL AUTHORITY

CROSS-REFERENCE TO RELATED APPLICATION

The present application claims the benefit of the filing date of U.S. Provisional Application Ser. No. 62/674,291 filed on May 21, 2018, which is incorporated herein by reference.

BACKGROUND

The present disclosure relates to controls for shaping or modifying a level of control authority in an autonomous vehicle responsive to a variety of changing conditions.

Autonomous vehicles may operate separately or in a group of vehicles in close proximity using radar, Lidar, proximity sensor information and may also coordinate among themselves using some form of direct or indirect (e.g., cloud-based) communication between vehicles. These techniques allow an autonomous vehicle to traverse a route with minimal or no operator input. This may also allow coordinated decisions among the vehicles for safety and optimized fuel economy and emissions. However, conditions may require, or may be better responded to, by a response that deviates from a nominal level of control authority.

DISCLOSURE OF ILLUSTRATIVE EMBODIMENTS

For the purposes of clearly, concisely and exactly describing illustrative embodiments of the present disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

SUMMARY OF THE DISCLOSURE

Exemplary embodiments include unique apparatuses, methods and systems for adjusting the level of control authority of one or more vehicles in order to respond to changes in one or more operating conditions associated with the vehicle, operator, environment, route, etc. Further embodiments, forms, objects, features, advantages, aspects, and benefits shall become apparent from the following description and drawings.

DETAILED DESCRIPTION OF ILLUSTRATIVE EMBODIMENTS

Figure 1:
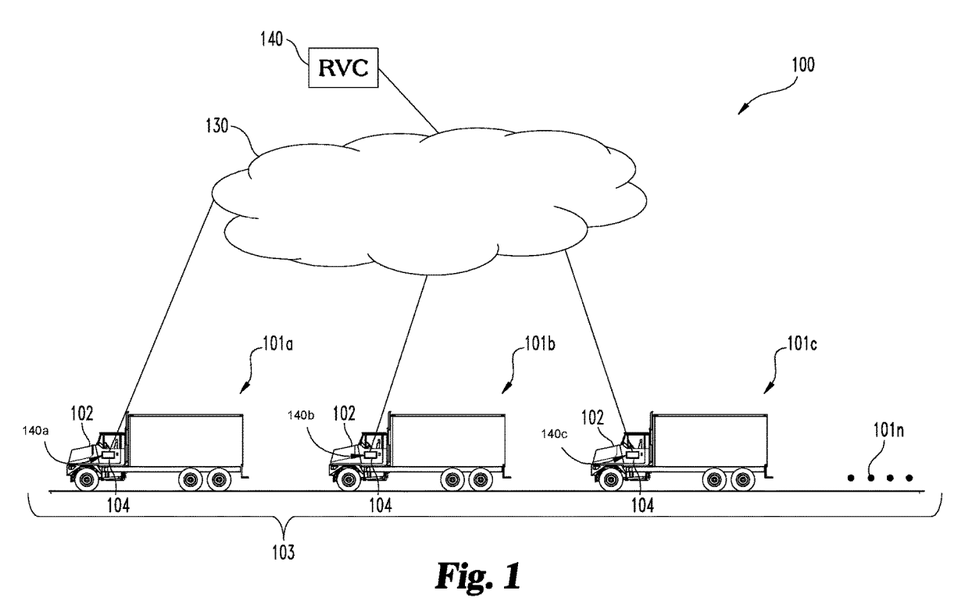
FIG. 1 is a schematic illustration of an example vehicle control system for one or more vehicles.

With reference to FIG. 1 there is illustrated a schematic view of an example vehicle control system 100 including a vehicle cohort 103 comprising a plurality of vehicles 101a, 101b, 101c and potentially additional vehicles as denoted by ellipsis 101n. Vehicles 101a, 101b, 101c . . . 101n may be referred to individually as a vehicle 101 and collectively as vehicles 101 or collectively as vehicle cohort 103. While vehicle cohort 103 is illustrated as comprising at least three vehicles 101, it shall be appreciated vehicle cohorts according to the present disclosure may comprise any number of vehicles traveling alone or in proximity to one another and/or along a route such that information about characteristics, operation and/or performance of one or more of the vehicles can be obtained and processed to independently or collectively adjust or tune the level of autonomous vehicle control of one or more of the vehicles, either operating outside of a cohort or operating within a cohort.

Such processing may occur at an on-board control system of one or more of the vehicles or at an off-board computing system in communication with one or more of the vehicles. It shall be further appreciated that certain forms of vehicle cohort operation may comprise platooning operation in which two or more vehicles actively participate in coordinating operation of the vehicle cohort. In another embodiment, certain forms of vehicle cohort operation do not require the active participation of multiple vehicles. For example, one vehicle can sense or receive information about characteristics, operation and/or performance of one or more other vehicles in the cohort and process that information along with information about its own characteristics, operation and/or performance to adjust its own level of autonomous vehicle control.

Vehicle 101 may be any one of a variety of types of vehicles such as trucks, tractor-trailers, box trucks, busses, passenger cars and trucks, and construction vehicles or machinery, among others. The vehicles 101 illustrated in FIG. 1 are depicted as tractor trailers, but any other type of vehicle is contemplated herein. Some embodiments contemplate that vehicles 101 may each be the same or similar types of vehicles, for example, in the case of a commonly managed vehicle fleet. Some embodiments contemplate that vehicles 101 may comprise different types or classes of vehicles, for example, semi tractor-trailers and passenger cars. Each vehicle 101 includes a prime mover 102, such as an internal combustion engine, electric motor, or hybrid engine-electric system, structured to output power to propel the vehicle 101. Some embodiments contemplate that prime movers 102 may each be the same or similar types of prime movers, for example, in the case of a commonly managed vehicle fleet. Some embodiments contemplate that prime movers 102 may comprise different types or classes of prime movers, for example, prime movers of different sizes, powers or types (e.g., diesel engine powertrains, gasoline engine powertrains, natural gas powertrains, hybrid-electric powertrains, and electric powertrains). For ease of description prime mover 102 may be referred to herein as an engine, however, it shall be understood that these references also apply to and include other types of prime movers.

Vehicle cohort 103 is illustrated in a platooning mode of operation in which vehicles 101 act in a coordinated manner to reduce net fuel or energy consumption and increase net operating efficiency of the vehicle cohort 103. However, a platooning mode of operation is not required for the present disclosure. Each vehicle 101 utilizes one or more environmental sensor systems to determine its positioning relative to other vehicles in vehicle cohort 103, to vehicles not in vehicle cohort 103, and to objects along the route. Examples of the types of environmental sensor systems that may be utilized include radar systems, Lidar systems, proximity sensor systems, and combinations of these and/or other sensor systems. Each vehicle 101 in vehicle cohort 103 also includes a wireless communication system allowing vehicle-to-vehicle (V2V) communication or vehicle-to-X (V2X) communication where X denotes a variety of possible types of external networks.

Each vehicle 101 includes a vehicle electronic control system (VECS) 104 which is structured to control and monitor operation of its respective vehicle 101, as well as to participate in cohort mode coordinated operation as disclosed herein. Each VECS 104 typically comprises one or more integrated circuit-based electronic control units (ECU) or other control components which may be operatively coupled to one another over a communication bus or network such as a controller area network (CAN) and which are structure to implement various controls, for example, an engine ECU structured to control and monitor operation of an engine and engine accessories, a transmission ECU structured to control and monitor operation of a transmission, a wireless communication ECU structured to control ex-vehicle wireless communications, and one or more environmental sensor ECUs structured to control operation of an environmental sensor system may be provided. It shall be appreciated that the control logic and vehicle control processes disclosed herein may be performed by controllers or controls which are implemented in dedicated control components of VECS 104 (e.g., in a dedicated ECU or other dedicated control circuity) or may be implemented in a distributed fashion across multiple control components of VECS (e.g., through coordinated operation of an engine ECU, a transmission ECU, a wireless communication ECU and an environmental sensor ECU).

The ECUs and other control components of VECS 104 may comprise of digital circuitry, analog circuitry, or combinations thereof. The ECUs and other control components of VECS 104 can be programmable, an integrated state machine, or a hybrid combination thereof. The ECUs and other control components of VECS 104 can include one or more Arithmetic Logic Units (ALUs), Central Processing Units (CPUs), memories, limiters, conditioners, filters, format converters, or the like which are not shown to preserve clarity. In one form, the VECS 104 is of a programmable variety that executes algorithms and processes data in accordance with operating logic that is defined by executable program instructions stored in a non-transitory memory medium (e.g., software or firmware). Alternatively or additionally, operating logic for the VECS 104 can be at least partially defined by hardwired logic or other hardware.

The environmental sensor systems and wireless communication capabilities of vehicles 101 allow their operation to be coordinated using direct and/or indirect communication. For example, vehicles 101 may accelerate or brake simultaneously, or in a coordinated sequence, maintain a particular distance relative to one another, or maintain a particular lateral offset relative to one another. Coordinated operation of vehicle cohort 103 allows a closer following distance between vehicles 101 by compensating for or eliminating a reaction distance between vehicles that is needed for human reaction. Coordinated operation of vehicle cohort 103 further allows for operation that reduces net fuel consumption and/or increases net efficiency of the vehicle cohort 103. One or more of vehicles 101 may in some embodiments, be equipped with aerodynamic features (wind assist panels on cab & trailer, aerodynamic tractor body) that create a laminar flow of air (tunnel effect) that greatly reduces air drag. Other vehicles among vehicles 101 may be spaced close enough to the vehicle taking advantage of a wind break tunnel to increase fuel economy. It shall be appreciated that the controls disclosed herein can mitigate aerodynamic losses both by adjusting vehicle following distance(s) and vehicle lateral offset.

In certain embodiments in which vehicle 101 is part of a vehicle cohort 103, or in which a single vehicle is remotely monitored, coordinated operation of vehicle 101 and/or vehicle cohort 103 may be provided at least in part by a remote vehicle controller (RVC) 140. As illustrated in FIG. 1, RVC 140 may be provided wholly or partially in a computing system remote from vehicle(s) 101, e.g., a cloud-based control system in operative communication with the VECS 104 of each of vehicles 101 via one or more communication networks 130. The RVC 140 may also be provided, wholly or partially, on board one or more vehicles of a cohort and may be part of a VECS 104 or implemented in an independent electronic control system. For example, RVC 140a, 140b, 140c may be provided in or in conjunction with the VECS 104 of one or more vehicles 101 within vehicle cohort 103. In certain forms, the RVC 140 may be distributed among two or more vehicles. For example, RVC 140 may be distributed among two or more VECS 104 or other vehicle-based electronic control systems within vehicles 101. Thus, it shall be appreciated that the RVC 140 may be provided solely as RVC 140, solely as one of VECS 104a, 104b, 104c, as a distributed system including two or more of VECS 104a, 104b, 104c, or as a distributed system including RVC 140 and one or more of VECS 104a, 104b, 104c. In the discussion that follows, the vehicle control process is referred to with respect to VECS 104. However, it should be understood in another embodiment that the vehicle control process may also be performed entirely or in part with RVC 140.

Figure 2:
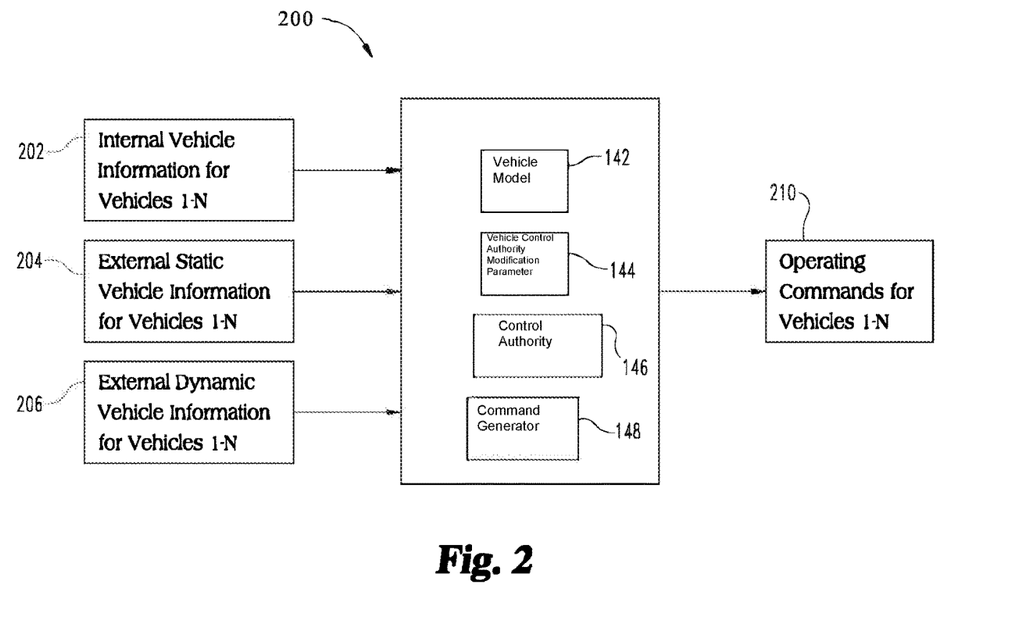
FIG. 2 is a schematic illustration of an exemplary vehicle controller and its inputs and outputs.
Figure 3:
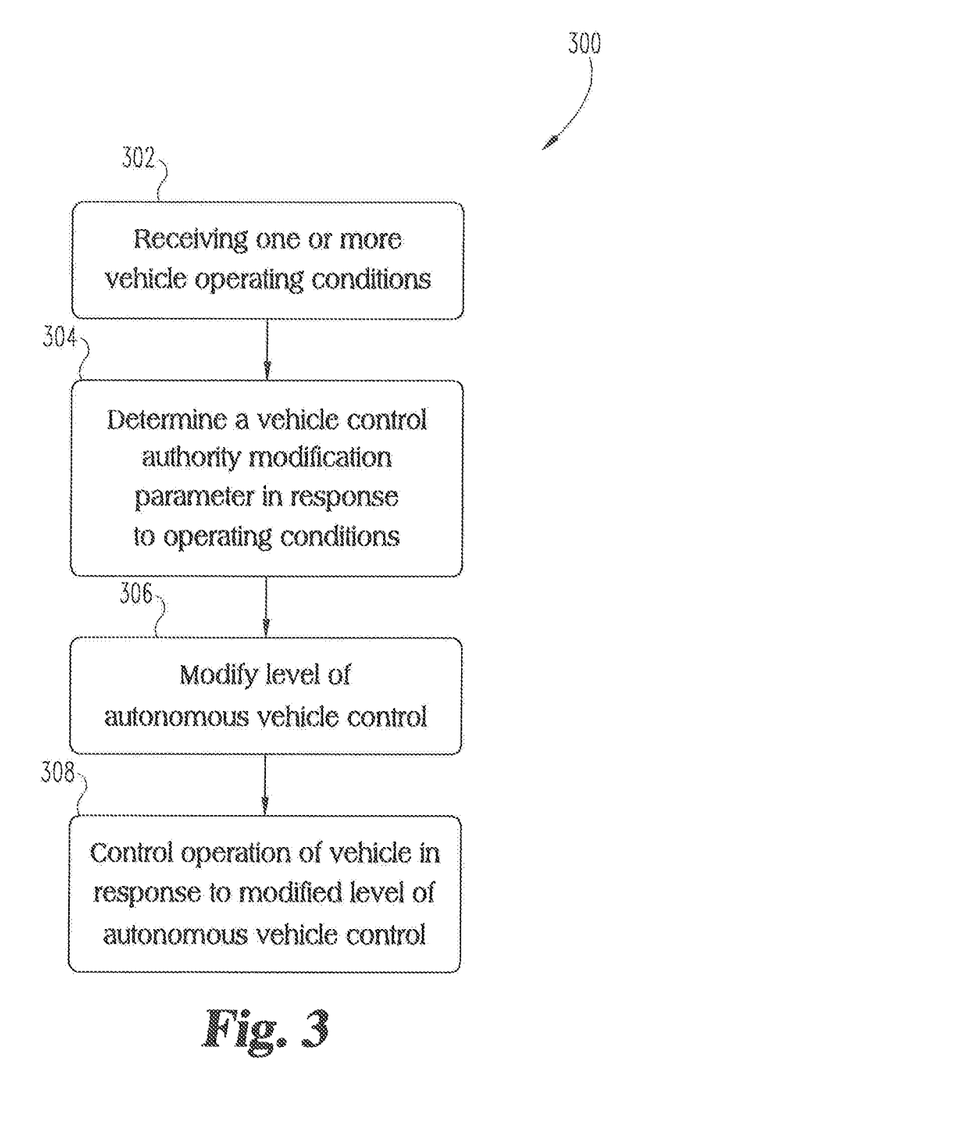
FIG. 3 illustrates a flow diagram of an exemplary vehicle control process.

With reference to FIG. 2 there is illustrated a schematic depiction of an electronic controller 200 in one exemplary form, such as VECS 104 and/or RVC 140. In the illustrated embodiment, controller 200 may perform a vehicle control process (e.g. vehicle control process 300 as illustrated in FIG. 3) which includes adjusting a level of autonomous control authority of vehicles 101 based on a vehicle control authority modification parameter that is determined in response to one or more varying operating conditions. Controller 200 may determine a dynamic response capability change for vehicle 101 so that a level of autonomous control authority is increased or decreased depending on the conditions encountered.

In one embodiment, the vehicle control process includes controller 200 receiving one or more operating conditions associated with at least one vehicle operable along a route via a prime mover 102, determining with the controller 200, in response to the one or more operating conditions, a vehicle control authority modification parameter for the at least one vehicle, modifying a level of autonomous vehicle control in response to the vehicle control authority modification parameter, and controlling operation of the at least one vehicle in response to the modified level of autonomous vehicle control. The vehicle control authority modification parameter can include, for example, modifying or adjusting a level of control authority from completely autonomous to completely non-autonomous, from completely non-autonomous to completely autonomous, to modify or adjust one or more control decisions in the control authority from autonomous to an operator, and to modify or adjust one or more control decisions in the control authority from an operator to autonomous. The vehicle control authority modification parameter can also or alternatively include an alert or message to the vehicle operator to become engaged or more engaged in control of one or more aspects of the vehicle.

Controller 200 may include a vehicle models block 142 which may determine vehicle capability based on estimated and known vehicle parameters or operating conditions, a vehicle control authority modification parameter block 144 which may determine an autonomous vehicle control capability and modification parameter based on estimated and known operating condition information, a control authority block 146 which may determine a level of autonomous control for the vehicle 101 based on the vehicle control authority modification parameter, and a command generator block 148 which may generate commands to provide the desired or required level of autonomous control authority for the vehicle 101 based on the vehicle control authority modification parameter. Controller 200 may determine to increase the level of autonomous vehicle control or decrease the level of autonomous vehicle control depending on the vehicle control authority modification parameter.

Controller 200 may be provided with inputs from blocks 202, 204 and 206. Block 202 provides internal vehicle information for vehicles 1-N (where 1 is a front/single vehicle and N is a number of rearward vehicles). Block 204 provides external static vehicle information for vehicles 1-N. Block 206 provides external dynamic vehicle information for vehicles 1-N. Controller 200 provides output block 210 which outputs operating commands to vehicles 1-N.

Internal vehicle information 202 may include information about vehicle components and immediate surroundings that changes with time and is available only at a given instance. This information may be available from on-board sensors and communication with other vehicle powertrain components, and may include, for example, engine speed, vehicle speed, wind speed, wind direction, temperature, humidity and current road grade, among others. External static information 204 may include information about things outside of the vehicle 101 that time invariant or change over a longer time frame (e.g., hourly, daily, weekly or seasonally). This information may be available from map based data via communication with other devices outside of the vehicle 101. For example, for a VECS 104$a$, other devices may include VECS 104$b$, 104$c$, RVC 140, etc. This information may include, for example, lane width, shoulder location, road grade, intersections, curvature, charging locations, construction, etc.

External dynamic information 206 may include information about things outside of the vehicle that change frequently over time. This information may be available from V2V and/or V2X communication. This information may include, for example, wind speed, wind direction, traffic density, weather forecast, traffic light phases, road conditions, and fuel or electricity price, among others. Operating commands 210 for one or more of vehicles 1-N may include commands to adjust a level of vehicle autonomous control authority, such as a dynamic response capability, in response to a vehicle control authority modification parameter. For example, VECS 104 and/or RVC 140 may process information about characteristics, operation and/or performance of one or more of vehicles 101 to adjust or tune the level of autonomous vehicle control of one or more of vehicles 101 in the vehicle cohort 103. Such processing may occur on-board one or more of the vehicles or at an off-board computing system in communication with one or more of the vehicles. VECS 104 and/or RVC 140 may automatically adjust safety system trims based on a variety of changing conditions. An important consideration for the deployment of an autonomous vehicle cohort is having a capable safety system. However, the capability of the safety system may need to be dynamically adjustable for a human operator to provide help when necessary, or to take over operation when a human operator is unresponsive or operating the vehicle in an unsafe manner.

The blocks 142, 144, 146, and 148 may be implemented in one or more non-transitory controller-accessible memory media in controller 200. It shall be appreciated that in other embodiments one or more of the blocks 142, 144, 146, 148 may comprise a different number of inputs configured to receive additional, alternate or fewer inputs than provided by blocks 202, 204 and 206. It shall be further appreciated that vehicle model block 142 may include control circuitry configured to determine vehicle capability based on estimated and known vehicle parameters or operating conditions from blocks 202, 204, and/or 206 and/or stored in a memory of controller 200. Vehicle control authority modification parameter block 144 may include control circuitry configured to determine an autonomous vehicle control capability and modification parameter based on estimated and known operating condition information from blocks 202, 204, and/or 206 and/or a memory of controller 200, and the vehicle capability from vehicle model block 142. Control authority block 146 may include control circuitry configured to determine a level of autonomous control for the vehicle 101 based on the vehicle control authority modification parameter from vehicle control authority modification parameter block 144. Command generator block 148 may include control circuitry configured to generate commands to provide the desired or required level of autonomous control authority for the vehicle 101 based on the vehicle control authority modification parameter from control authority block 146.

With reference to FIG. 3 there is illustrated a flow diagram of an exemplary vehicle control process 300. As described below, vehicle control process 300 may utilize internal vehicle information, external static vehicle information, and external dynamic vehicle information. One or more of these parameters may be determined using system identification techniques such as vehicle parameter determination (VPD). Exemplary VPD techniques are disclosed in U.S. Pat. No. 10,000,214 issued on Jun. 19, 2018, the disclosure of which is hereby incorporated by reference.

In particular, vehicle control process 300 provides an automated response to a variety of changing conditions in the environment, vehicle, operator, etc. by adjusting the level of autonomous authority of the control system. In general, vehicle control process 300 may choose to either increase or decrease the level of autonomous control authority, in an effort to increase the "safety level" of the vehicle and system, such as for one or more vehicles 101 and/or the vehicle cohort 103.

Vehicle control process 300 may include controlling a platoon consisting of multiple vehicles 101 (i.e. two or more 2) or controlling a single vehicle 101. Vehicle control process 300 may modify the level of autonomous control authority of a single vehicle 101, or one or more of a rearward vehicle and/or a forward vehicle in a platoon or vehicle cohort 103 (e.g. vehicle cohort 103.) Additional information to adjust the dynamic response capabilities of a vehicle includes weather, traffic, regulations, geo-fencing, powertrain derating events, aftertreatment temperature conditions, critical telematics information, emergency situations, etc.

Vehicle control process 300 may create a dynamic response capability to change a level of control authority of an autonomous vehicle 101 operating in isolation or as part of a platoon formation. The vehicle control process 300 may make use of knowledge of the surrounding vehicles, horizon data (both static and changing), telematics information, operator information, sensor data, etc. to determine the best strategy for adjusting or modifying the level of autonomous control. For example, an intelligent transportation system (ITS) or similar system can provide look ahead route, grade, traffic and other information. An ITS generally refers to the integration of information and communication technologies with transport infrastructure to improve economic performance, safety, mobility and environmental sustainability. An ITS may include real-time traffic information systems that collect data on traffic conditions, aggregate and translate the data, and disseminate the traffic data through various technologies. Such systems may enable dynamic route grade profiling through vehicle-to-vehicle communications, where grade information from preceding vehicles 101 is provided to the controller 200. Similarly, vehicles in the proximity of the route may provide speed and gear state information indicative of traffic volume, actual traffic speeds, and other dynamic route condition information.

The vehicle control process 300 may be applied to either a single vehicle operating independently, where constraints associated with any other vehicles are not considered, or a vehicle operating as part of a platoon, where constraints associated with the cohort vehicles are considered. The vehicle control process 300 may include critical safety systems and networks integrated into the vehicle system which may include safety system trims automatically adjusted based on a variety of dynamic operating and environmental conditions. An important consideration for the deployment of autonomous vehicles is having a capable safety system in place. However, the capability of this safety system may need to be dynamically adjustable to seek help from a human operator when necessary or to take control from a human operator when necessary.

The vehicle control process 300 may include an operation 302 that includes receiving, such as at VECS 104 and/or RVC 140, one or more operating conditions associated with at least one vehicle 101 operable along a route via a prime mover. The vehicle control process 300 further includes an operation 304 to determine, with the VECS 104 and/or RVC 140 in response to the one or more operating conditions, a vehicle control authority modification parameter for the at least one vehicle 101. The vehicle control process 300 also includes an operation 306 to modify a level of autonomous vehicle control with VECS 104 and/or RVC 140 in response to the vehicle control authority modification parameter. Vehicle control process 300 also includes an operation 308 to control operation of the at least one vehicle 101 with VECS 104 and/or RVC 140 in response to the modified level of autonomous vehicle control. The VECS 104 and/or RVC 140 can be provided at least in part in an electronic control unit of the at least one vehicle or remotely from the vehicle 101.

In a first embodiment of vehicle control process 300, the operating conditions include a quality of incoming vehicle data from one or more sensors associated with the vehicle 101 and the vehicle control authority modification parameter is based on an assessment of the quality of the incoming vehicle data from the one or more sensors. In a second embodiment of vehicle control process 300, the operating conditions include an available level of autonomous vehicle control provided by each of two or more sensors associated with the vehicle, and the vehicle control authority modification parameter is based on an arbitration of an available capability level of autonomous vehicle control provided by the two or more sensors. In a third embodiment of vehicle control process 300, the operating conditions include telemetry data associated with a maneuver of the vehicle 101 and the vehicle control authority modification parameter is based on an assessment of the telemetry data and a likelihood of violation of an operating constraint based on the assessment. In a fourth embodiment, the operating conditions include operator data associated with a capability of an operator of the vehicle 101 and the vehicle control authority modification parameter is based on an assessment of the operator capability data. The operator capability data includes at least one of a responsiveness of the operator and an inappropriate/unsafe operator maneuver. In a fifth embodiment, the operating conditions include geo-fencing data and the vehicle control authority modification parameter is based on an assessment of the geo-fencing data.

In the first embodiment of vehicle control process 300, a system and method including VECS 104 and/or RVC 140 is provided for incoming data quality assessment and adjustment of the autonomous vehicle control response based on the assessment. For a safety system, numerous sensors may be on-board the vehicle 101 supporting the system behavior. At any given time, critical environment elements being sensed lead to the control algorithm inputs that govern the overall system behavior. A single environment parameter may be sensed in a multitude of ways with varying degrees of resolution, certainty and rates. This multitude of options may be defined off-line through the appropriate system analysis. Based on this analysis a table, chart, or some record of options may be created in memory of the VECS 104 and/or RVC 140 with the associated characteristics quantified.

Examples of a vehicle sensor suite include one or more of the following: RADAR, LIDAR, camera with visual spectrum, camera with infrared spectrum, ultrasonics, yaw rate, lateral acceleration, steering angle, grade, vehicle mass, vehicle speed, accelerator pedal position, ABS sensor, transmission gear state, and horizon data (from an ITS and/or static maps). A single environment parameter may be sensed in a multitude of ways with varying degrees of resolution, certainty and rates. In addition, a single environment parameter may be measured by combining the incoming data from unique (non-correlated) sensing sources to improve the measurement uncertainty, such as is provided by sensor fusion. Furthermore, a combination of real data may be used to infer the value of some other parameter that may or may not be directly observed, such as by a virtual sensor.

Sensing uncertainty may be characterized into 5 basic groups. 1) Random noise—electrical or other noise that creates a sample-to-sample random movement about an average value for a steady environment parameter. 2) Bias noise—the average value in the above case has an offset or error from the true value of the sensed parameter. 3) Model uncertainty—using a physics or mathematical basis in the design of a virtual sensor may introduce errors in how well the model has been established. 4) Quantization uncertainty—conversion of an analog signal into a digital signal forces some degree of error when moving from the continuous domain to the discrete domain. 5) Dynamic or transient uncertainty—a sensed value is unable to keep up with the actual value of the parameter as it is changing.

Incoming data uncertainty may also change over time due to a multitude of reasons such as sensor degradation/aging, temperature/pressure/weather, failure modes of sensors, incorrect service or installation, environment changes (such as fog) for sensors detecting the environment, corrosion, debris, dust, chemical, etc. build-up on a sensing element. When this occurs assessing both the change and the impact of the change can be identified, such as in VECS 104 and/or RVC 140. Original uncertainty due to the basic sensing system is characterized before the system is deployed.

Change in error may be assessed via re-sampling or through redundant system checks. Re-sampling includes taking multiple readings of the same parameter and identify if there is a change in measurement that can be used to characterize the change in error. A redundant system check uses another sensor to make the measurement and determine via a-priori relative measurement uncertainty if the original system has changed. One example is using a camera to measure a feature that is typically measured by LIDAR, and then, using the relative uncertainty between a LIDAR and a camera as well as the measurements, determine if the LIDAR measurement capability has changed. Other methods to determine this change are also contemplated, such as predictive models that have identified the change to the sensor. For example, knowledge of the environment temperature change may directly be associated with modeled errors of a camera system.

Once the incoming data uncertainty (or change) has been established, using predefined models on the relationship between the various sensors suite options and the measured phenomena, a choice may be made to select a different sensing solution or the optimum sensing suite. Alternatively, if sufficient sensing degradation has occurred then the controller may be deemed incapable of achieving the desired target. Targets or gains of the controller may be relaxed. For example, if vehicle proximity sensing is degrading then minimum separation distance may be increased and/or a warning indicator may be activated. The VECS 104 and/or RVC 140 may request additional human intervention, such as to reset control levers, take over partial control of the vehicle system, or other action for performance by the operator.

Figure 4A:
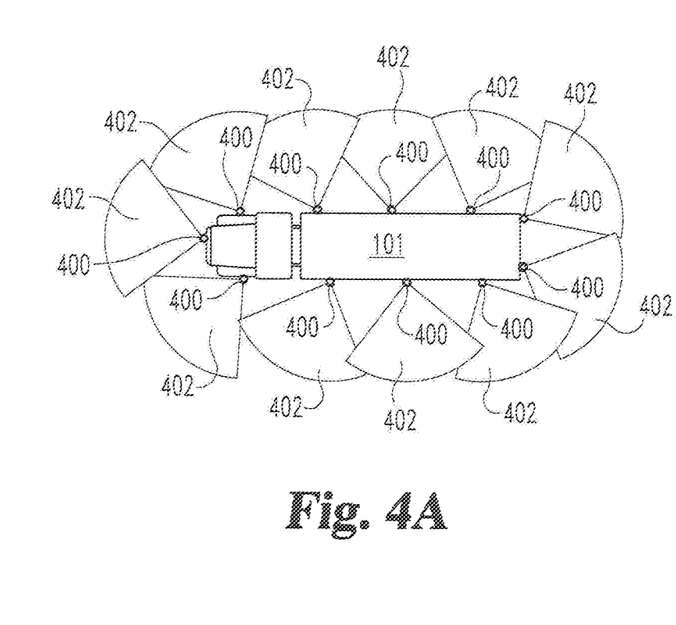
FIGS. 4A-4B illustrate a sensor arrangement on a vehicle.
Figure 4B:
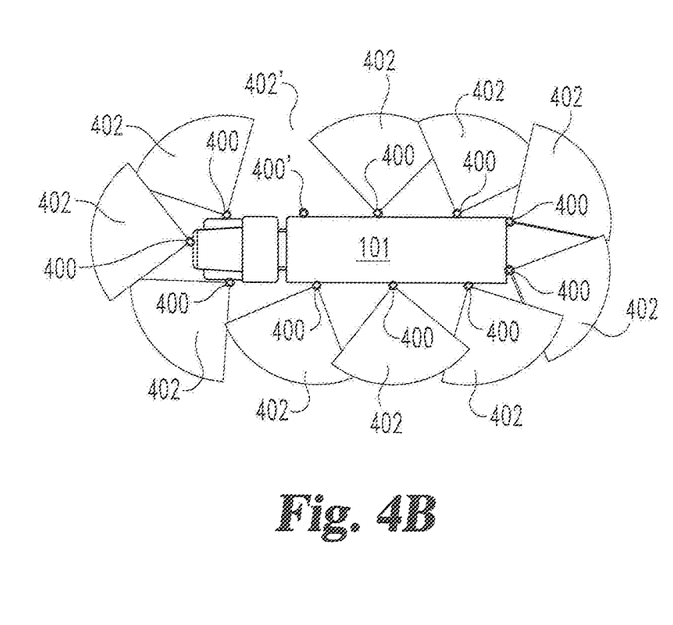

As one example shown in FIGS. 4A-4B, vehicle 101 is shown with a capability to create a 360° view of its environment through a sensor suite that includes number of sensors and/or cameras 400 mounted around its periphery that sense/view in their respective regions 402. If a sensor 400' fails, a blind spot or a region of greater uncertainty 402' in the data will emerge. Compensations may include filling data with repeated or increased frequency measurements from neighboring sensors 400, picking up information by moving the neighboring sensors 400 either via vehicle movement or via the direct sensor movement, manipulating the sensors 400 to cover for the degraded sensor through sensor fusion, changing a field of view of one or more sensors or cameras 400, and/or using a second sensor 400. As the level of autonomy drops, then the operator can be alerted by VECS 104 and/or RVC 140 to become more engaged in controlling the vehicle 101.

In the second embodiment of the exemplary vehicle control process 300, there is provided autonomy level adjustment based on available sensing capability. In this embodiment, the VECS 104 and/or RVC 140 determines what level of autonomous operation is available based on the sensors 400 that are available for the vehicle 101. The available sensors 400 may change not due to a failure mode, but rather through the active inclusion or exclusion of sensors 400. For example, with line haul tractor trailers, it may be the case that any one of the following autonomy levels for the tractor and the trailer combination can be provided as set forth in Table 1.

TABLE 1

| Tractor | Trailer | Autonomy level |
| --- | --- | --- |
| Simple | Simple | None |
| Advanced sensing | Simple | Level 1 |
| Simple | Advanced sensing | Level 1 |
| Advanced sensing | Advanced sensing | Level 1 |
| Advanced sensing/actuation | Simple | Level 2 |
| Advanced sensing/actuation | Advanced sensing | Level 3 |
| Simple | Advanced sensing/actuation | Level 1 or 2 |
| Advanced sensing | Advanced sensing/actuation | Level 1 or 2 |
| Advanced sensing/actuation | Advanced sensing/actuation | Level 3 or 4 |

Since the tractors and trailers may be combined in a variety of ways, the VECS 104 and/or RVC 140 could actively conduct a self-assessment before a given mission to define the highest degree of autonomous operation of which the vehicle 101 is capable. Although only the term "Advanced Sensing" has been applied in Table 1, the specifics of the advanced sensing need to be known in conjunction with the system functionality for a broad systems-based approach. This information may be used by the fleet or end-user to make logistic plans including the route, operator assignments to vehicle, cargo assignments to vehicle, etc. This would be critical from a safety system perspective to identify correctly the autonomy level the system is capable of supporting and providing the right overall mission solution for the vehicle 101 and/or the vehicle cohort 103 based on the available sensing capability.

Figure 5A:
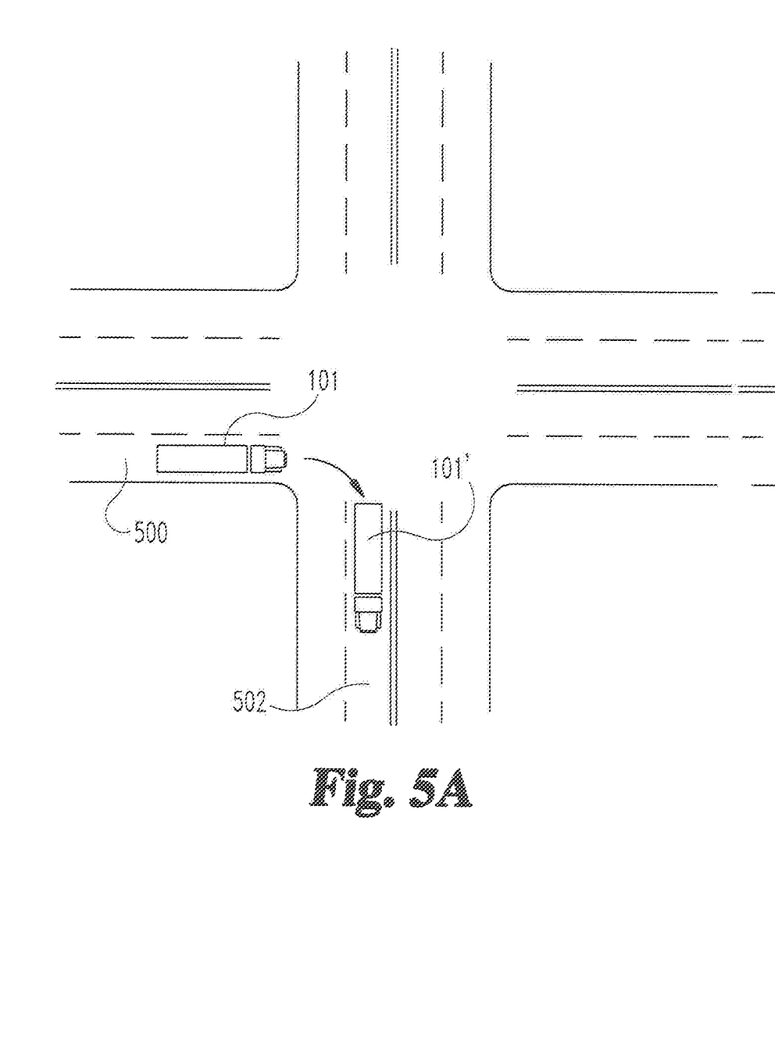
FIGS. 5A-5B illustrate vehicle maneuvers that constitute operating constraint violations.
Figure 5B:
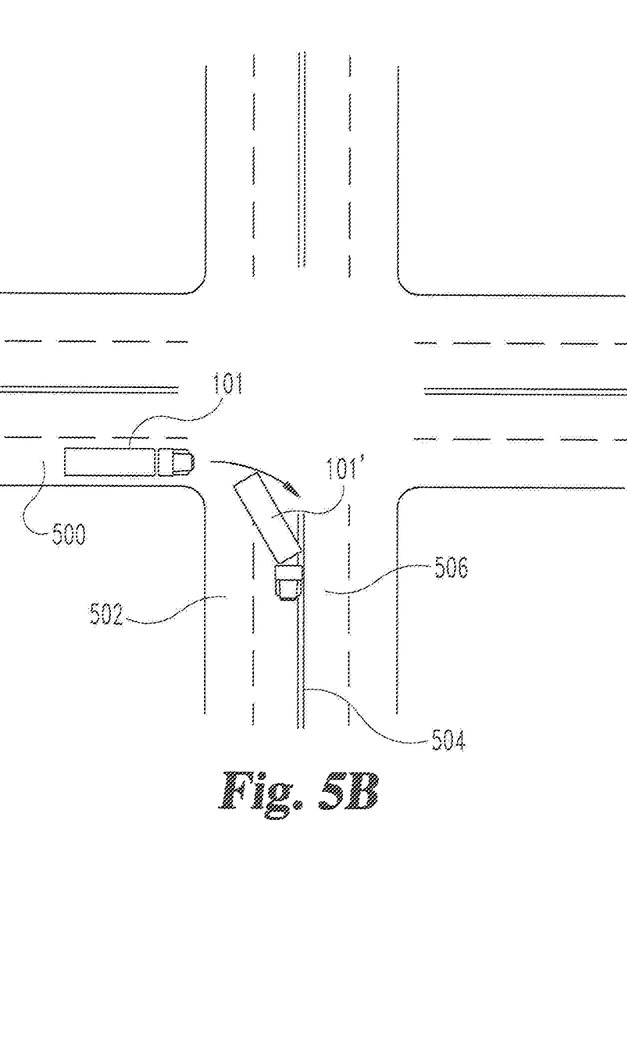

In the third embodiment of the exemplary vehicle control process 300, user intervention may be required for a vehicle maneuver that may result in violation of an operating constraint, such as travel lane maintenance. For example, as shown in FIG. 5A during autonomous or semi autonomous driving maneuvers a large vehicle (such as a transit bus or a tractor-trailer) 101 may need to violate the need to maintain its lane during a turn to successfully make the turn. This action may require returning the control to the operator based on a safety requirement of such a maneuver. For example, a maneuver may be a mild violation, where the vehicle 101 is required to move from an inside lane 500 to an outside lane 502 when turning a corner, as shown by vehicle 101'. A major violation may involve the turn requiring the vehicle 101 to travel from the inside lane 500, across the outside lane 502, and across the centerline 504 into the lane 506 of oncoming traffic to complete the turn, as shown by vehicle 101' in FIG. 5B.

The vehicle telemetry is determined a-priori and an intelligent decision is made by VECS 104 and/or RVC 140 based on available data. The intelligent decision may evaluate the telemetry data to determine if the vehicle maneuver will be safe or unsafe, what is the degree of safety, or violate some other operating constraint. For example, a lane-to-lane turn can be deemed safe, unless a vehicle or other object is blocking the lane into which the turn is made. A lane-to-lane turn that requires a curb climb can be deemed marginally safe but worsens if pedestrians or other curb/sidewalk users are present. An inside lane-to-outside lane turn (FIG. 5A) can be deemed marginally safe but worsens if the outside lane has high likelihood of usage, or can be deemed safe at low speeds and no traffic in the outside lane. A lane encroachment on opposite direction lane (FIG. 5B) can be deemed unsafe if there is oncoming traffic but improves if the opposite lane has low likelihood of usage. The control operation and capability (available data) settings will be used to create a threshold to determine if a human operator needs to be pulled back in to operate the vehicle 101, such as to pull the vehicle 101 over or stop the vehicle 101 to allow the oncoming traffic to pass. The algorithm will also determine acceptable upper limit of vehicle speed (engine power) to conduct the maneuver based on the degree of safety.

In a fourth embodiment of the exemplary vehicle control process 300, control adjustment by VECS 104 and/or RVC 140 for a non-responsive operator is provided. Autonomous operation can derate the vehicle motion to bring the vehicle 101 to a halt in the presence of an incapacitated or non-responsive operator. For example, while Level 1-Level 4 (Table 1) automation may not always require an operator at the helm of the vehicle 101, it can also be required that the operator be responsive to the vehicle 101, such that human intervention within a deterministic reaction time is possible. As such the VECS 104 and/or RVC 140 can provide a form of operator alertness monitor to provide a continuous "heartbeat" signal. This could take various forms. For example, Level 1-2 automation may involve non-autonomous operations that require the operator to be monitored for activity feedback. Examples the operator interacting with a steering wheel control or an indicator control in the presence of lane changes. Level 3-4 automation may involve direct operator input "ping" at predefined time intervals. Examples include a push button on the dash, an electronic hourglass, camera feedback, a dead man switch, or other suitable input. In another embodiment, the operator responsiveness is determined based on the vehicle 101 following or not following a predetermined route. For example, the operator may deviate from the predetermined route, indicating a possibility that the operator has taken an unauthorized departure from the route or the vehicle has been stolen, for example.

A non-responsive operator state can be determined by VECS 104 and/or RVC 140, and may include a severity indicator that is computed based on the time difference to the last "heartbeat" signal. Based on the non-responsive operator state, the VECS 104 and/or RVC 140 outputs an autonomous response behavior. Any autonomous function derating may include signals to the operators/passengers in the form of auditory, visual, or vibratory indicators. Level 1-2 automation derating may simply discontinue the autonomous function.

Level 3-4 automation is more complex and may need to consider ways of bringing the vehicle to a stop. For example, to respond to a nonresponsive operator, the vehicle 101 should be brought to a rest by VECS 104 and/or RVC 140 in a manner safe to both the occupants/cargo of the vehicle as well as other vehicles and/or vehicle occupants/cargo in the vicinity of the vehicle. The limits of the autonomous function of the system must determine how to bring the vehicle to a stop. This may or may not involve changing lanes to get to a shoulder/exit ramp. It may or may not involve determining what the surrounding vehicles are doing. It may or may not provide an external alarm, such as flashing lights or sounds or telematics information broadcast. However, VECS 104 and/or RVC 140 must have access to engine and brakes such that the system can be de-throttled (or brought out of cruise), slowed down with the adequate use of engine brakes and foundation brakes. Optionally, VECS 104 and/or RVC 140 may make use of the transmission to appropriately shift gears to allow optimum use of engine brakes and balance that with the use of the foundation brakes.

VECS 104 and/or RVC 140 may make use of horizon data to determine how best to respond to the upcoming grade, curvature, intersections, traffic, and other road features such that the vehicle stops at a safe location per the static maps, for example not stopping on a railroad track or in the middle of an intersection. If VECS 104 and/or RVC 140 causes the vehicle to switch lanes to come to a side lane, then VECS 104 and/or RVC 140 must also assess the behavior of the neighboring vehicles before it does so through measurements and/or two-way communication with those neighboring vehicles. VECS 104 and/or RVC 140 may also provide some form of an advanced warning of upcoming vehicle behavior. Another embodiment of this autonomous derating would be through the opposite of the "heartbeat" monitor but rather an emergency state switch which when triggered provides the same set of response options as those described with the non-responsive operator trigger.

In a variation of the fourth embodiment of the exemplary vehicle control process 300, vehicle 101 is derated in the event that an inappropriate/unsafe operator is identified. The limits of the autonomous function of the system must determine how to best derate the system, which may not necessitate bringing vehicle 101 to a full stop. Critical unsafe operational behaviors may be identified as: excessive speeds over the regulated speed limit, excessive speeds in the presence of road hazards (e.g. people, animals, objects, cars, etc.) determined through telematics interfaces and onboard sensing, excessive turning rates not aligned with the expected shape of the road (e.g. very tight turns at relatively high speeds, excessive lane switching), higher speed off-road driving (based on road locations from eHorizon maps), heavy acceleration and deceleration behaviors in the presence of road hazards (i.e. aggressive driving habits), driving through a road that cannot support the vehicle (e.g. weight and clearance), inappropriate use of engine brakes in regions with sound control regulations, unsafe operation of vehicle at high speeds (e.g. drafting or platooning), and/or inappropriate use of vehicle in regions of emissions control regulations.

Examples of driver behavior and possible responses are provided in Table 2 below.

TABLE 2

| Behavior | Response |
| --- | --- |
| Excessive road speeds | Temporary derate through road speed governor |
| Excessive speeds in the presence of road hazards | Temporary derate through road speed governor |
| Excessive turning rates not aligned with the expected shape of the road | Temporary derate through road speed governor Temporary derate through Power Steering Regulator |
| Higher speed off-road driving | Temporary derate through road speed governor |
| Heavy acceleration and deceleration | Temporary derate through vehicle acceleration manager |
| Inappropriate road usage | Severe vehicle speed derate Automatic braking |
| Inappropriate use of engine brakes | Deactivate engine brakes |
| Unsafe drafting or platooning | Velocity control to manage separation distance |
| Unsafe emission per geo-fences | Deactivate engine and activate alternative energy source Increase aftertreatment efficiency (trade off fuel economy for lower emission) |

The fifth embodiment of the exemplary vehicle control process 300 includes geo-fencing adjustments. Geo-fencing can be used to adjust the overall vehicle safety settings. For example, in response to vehicle 101 entering a city boundary, VECS 104 and/or RVC 140 can deactivate platooning based safety functions and activate operator control of the vehicle to environment hazard avoidance (people, animals, slow moving objects, etc.) In response to the vehicle entering a port or traversing an unmarked road, the VECS 104 and/or RVC 140 can create virtual lanes in the absence of marked lanes. In response to the vehicle entering a construction zone, VECS 104 and/or RVC 140 increases margins of safety in separation distances and reduced speeds, and the VECS 104 and/or RVC 140 would also more actively engage the human operator during tight turn maneuvers. In response to the vehicle entering parking lots or rest stops, additional virtual lanes or traffic markers may be created, such as multiple-way stops, yielding to oncoming vehicles, and basic parking strategies are established (i.e. how a vehicle must move to enter a designated parking spot). Vehicle speed limits are also created by VECS 104 and/or RVC 140 based on the characteristics of the parking lot (i.e. varying based on the degree of other targets).

When travelling on roads where animal presence has a greater probability, vehicle speed limits are adjusted by VECS 104 and/or RVC 140 based on time of day, level of traffic (more vehicles would reduce the likelihood of random animal crossings), stopping capability of the vehicle (based on mass, road surface conditions, foundation brakes capabilities, etc.), specific seasonal considerations based on animal movements (mating season, migration patterns, etc.). Locations or animal hazards and/or road hazards can be determined by analyzing braking patterns and/or placing sensors high up on the vehicle 101. In response to the vehicle 101 entering hospital or emergency zones, VECS 104 and/or RVC 140 can increase "pull over" readiness by limiting vehicle speed and staying in the curb lane.

While illustrative embodiments of the disclosure have been illustrated and described in detail in the drawings and foregoing description, the same is to be considered as illustrative and not restrictive in character, it being understood that only certain exemplary embodiments have been shown and described and that all changes and modifications that come within the spirit of the claimed inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A method comprising:
    receiving at an electronic controller one or more operating conditions associated with at least one vehicle operable along a route via a prime mover;
    determining with the electronic controller, in response to the one or more operating conditions, a vehicle control authority modification parameter for the at least one vehicle, wherein the operating conditions include telemetry data associated with a maneuver of the at least one vehicle and the vehicle control authority modification parameter is based at least in part on an assessment of the telemetry data for a maneuver of the at least one vehicle that determines a likelihood of violating an operating constraint by the at least one vehicle;
    modifying a level of autonomous vehicle control in response to the vehicle control authority modification parameter, wherein the vehicle control authority modification parameter modifies one or more control decisions from autonomous control to operator control based on the assessment of the telemetry data determining the operating constraint will be violated by the maneuver under autonomous control; and
    controlling operation of the at least one vehicle in response to the modified level of autonomous vehicle control.

2. The method of claim 1, wherein the electronic controller is provided entirely in at least one electronic control unit of the at least one vehicle.

3. The method of claim 1, wherein the electronic controller is provided entirely in at least one electronic control unit that is remote from the at least one vehicle.

4. The method of claim 1, wherein the electronic controller is distributed among at least one electronic control unit that is in the at least one vehicle and an electronic control unit that is remote from the at least one vehicle.

5. The method of claim 1, wherein the operating conditions include a quality of incoming vehicle data from one or more sensors associated with the at least one vehicle and the vehicle control authority modification parameter is based on an assessment of the quality of the incoming vehicle data.

6. The method of claim 1, wherein the operating conditions include an available level of autonomous vehicle control provided by each of two or more sensors associated with the at least one vehicle and the vehicle control authority modification parameter is based on a determination of an available capability level of autonomous vehicle control provided by the two or more sensors.

7. The method of claim 1, wherein the operating constraint for the at least one vehicle based is maintaining a travel lane for the at least one vehicle and the assessment of the telemetry data includes assessing the maneuver required by the at least one vehicle to make a turn while maintaining the travel lane.

8. The method of claim 1, wherein the operating conditions include operator data associated with the operator of the at least one vehicle and the vehicle control authority modification parameter is based on an assessment of the operator data.

9. The method of claim 8, wherein the operator data includes at least one of a responsiveness of the operator and an inappropriate/unsafe operator maneuver.

10. The method of claim 1, wherein the operating conditions include geo-fencing data along the route of the at least one vehicle and the vehicle control authority modification parameter is based on an assessment of the geo-fencing data.

11. A vehicle electronic control system, comprising:
    an electronic controller configured to:
        receive one or more operating conditions associated with at least one vehicle operable along a route via a prime mover;
        determine, in response to the one or more operating conditions, a vehicle control authority modification parameter for the at least one vehicle, wherein the vehicle control authority modification parameter is based at least in part on an assessment of telemetry data for a maneuver of the at least one vehicle that determines a likelihood of violation of an operating constraint for the at least one vehicle;

modify a level of autonomous vehicle control in response to the vehicle control authority modification parameter, wherein the vehicle control authority modification parameter modifies one or more control decisions from autonomous control to operator control based at least in part on the assessment of the telemetry data determining the operating constraint will be violated by the maneuver of the at least one vehicle under autonomous control; and control operation of the at least one vehicle in response to the modified level of autonomous vehicle control.

12. The vehicle electronic control system of claim 11, wherein the electronic controller includes a memory and a non-transitory computer readable medium including instructions encoded thereon.

13. The vehicle electronic control system of claim 11, wherein the electronic controller is provided entirely in an electronic control unit of the at least one vehicle.

14. The vehicle electronic control system of claim 11, wherein the electronic controller is distributed among an electronic control unit of the at least one vehicle and an electronic control unit that is remote from the at least one vehicle.

15. The vehicle electronic control system of claim 11, wherein the electronic controller is provided entirely remotely from and is in communication with an electronic control unit of the at least one vehicle.

16. The vehicle electronic control system of claim 11, wherein the operating conditions include one or more of:

a quality of incoming vehicle data from one or more sensors associated with the at least one vehicle;

an available level of autonomous vehicle control provided by each of two or more sensors associated with the at least one vehicle;

operator data associated with the operator of the at least one vehicle; and geo-fencing data along a route of the at least one vehicle.

17. The vehicle electronic control system of claim 11, wherein the vehicle control authority modification parameter is further based on one or more of:

an assessment of a quality of incoming vehicle data regarding the at least one vehicle;

a determination of an available capability level of autonomous vehicle control provided by two or more sensors on the at least one vehicle;

an assessment of a condition of the operator of the at least one vehicle; and an assessment of geo-fencing data along the route of the at least one vehicle.

18. The vehicle electronic control system of claim 11, wherein the modified level of autonomous vehicle control is a reduction in autonomous control capability of the at least one vehicle.

19. The vehicle electronic control system of claim 11, wherein the operating constraint for the at least one vehicle is maintaining a travel lane for the at least one vehicle and the assessment of the telemetry data includes assessing the maneuver required by the at least one vehicle to make a turn while maintaining the travel lane.

20. The vehicle electronic control system of claim 11, wherein the operating conditions including operator data associated with the operator of the vehicle and the vehicle control authority modification parameter includes initiating autonomous operation of the at least one vehicle in response to an unresponsive or unsafe operator behavior.

21. The vehicle electronic control system of claim 20, wherein the autonomous operation includes bringing the at least one vehicle to a stop.

22. The vehicle electronic control system of claim 11, wherein the operating conditions including geo-fencing data along a route of the at least one vehicle and the vehicle control authority modification parameter includes adjusting one or more safety parameters of the at least one vehicle in response to the geo-fencing data.

* * * * *